United States Patent
Short

(10) Patent No.: US 7,117,526 B1
(45) Date of Patent: Oct. 3, 2006

(54) METHOD AND APPARATUS FOR ESTABLISHING DYNAMIC TUNNEL ACCESS SESSIONS IN A COMMUNICATION NETWORK

(75) Inventor: Joel E. Short, Los Angeles, CA (US)

(73) Assignee: Nomadix, Inc., Westlake Village, CA (US)

( * ) Notice: Subject to any disclaimer, the term of this patent is extended or adjusted under 35 U.S.C. 154(b) by 933 days.

(21) Appl. No.: 09/693,369

(22) Filed: Oct. 20, 2000

Related U.S. Application Data

(60) Provisional application No. 60/160,890, filed on Oct. 22, 1999.

(51) Int. Cl.
*H04L 9/32* (2006.01)

(52) U.S. Cl. .................. 726/5; 726/4; 726/15; 380/281; 380/282; 380/285; 380/30; 705/67; 713/168; 713/169; 713/171; 713/172

(58) Field of Classification Search ................ 709/203, 709/225, 227, 229, 250; 713/200, 201, 168, 713/169, 171, 172; 370/463; 710/14, 36, 710/38, 41; 726/3, 15, 5, 14, 4; 380/281, 380/282, 285, 30; 705/67
See application file for complete search history.

(56) References Cited

U.S. PATENT DOCUMENTS

| | | | |
|---|---|---|---|
| 6,308,213 B1 * | 10/2001 | Valencia .................... | 709/229 |
| 6,512,754 B1 * | 1/2003 | Feder et al. ................. | 370/338 |
| 6,694,437 B1 * | 2/2004 | Pao et al. .................... | 713/201 |
| 6,754,831 B1 * | 6/2004 | Brownell .................... | 713/201 |

FOREIGN PATENT DOCUMENTS

| | | |
|---|---|---|
| EP | 0 917 318 A2 | 5/1999 |
| WO | WO 98/57465 | 12/1998 |

OTHER PUBLICATIONS

Gary Scott Malkin; Dial-in Virtual Private Networks Using Layer 3 Ttunneling; *Proceedings of the Conference on Local Computer Networks*, XX, XX; Nov. 2, 1997; pp. 555-561; XP002084438.
Layer 2 Tunneling Protocol; INTERNET, *Online!*; XP002175644; Retrieved from the Internet: URL:www.cisco.com (retrieved on Aug. 22, 2001); 1998; Cisco Systems, Inc.
Delayed Scenario for Access VPDN Dial-in Using L2TP; INTERNET, *Online!*; XP002175644; URL:www.cisco.com (retrieved on Aug. 22, 2001); 1998; p. 1, figure, 4, table 1.

* cited by examiner

*Primary Examiner*—Emmanuel L. Moise
*Assistant Examiner*—Paul Callahan
(74) *Attorney, Agent, or Firm*—Alston & Bird LLP

(57) ABSTRACT

A method and apparatus for implementing dynamic tunnel access sessions at a network device within a communications network. The tunnel access sessions are created between a network device, typically a gateway device and a network service, such as the Internet or a corporate intranet. The dynamic tunnel access sessions provide for subscriber-transparent tunneling. The present invention does not require special client-side software to be loaded on the remote host of the subscriber, and does not require any manual configuration of the remote host. A subscriber is capable of establishing more than one tunnel access session to more than one network service during a network session. Additionally, more than one subscriber who accesses the communication network via the network device is able to establish a communication link with a pre-existing tunnel.

18 Claims, 3 Drawing Sheets dated tunnel access sessions between a host computer and a plurality of networks. The method and apparatus provides automatic and dynamic tunneling of a host's data to an enterprise

METHOD AND APPARATUS FOR ESTABLISHING DYNAMIC TUNNEL ACCESS SESSIONS IN A COMMUNICATION NETWORK

CROSS-REFERENCE TO RELATED APPLICATIONS

The present application claims priority from U.S. Provisional Patent Application Ser. No. 60/160,890, filed Oct. 10, 1999, the contents of which are incorporated by reference.

FIELD OF THE INVENTION

The present invention relates generally to managing a communications network and, more particularly, to methods and apparatus for dynamically establishing tunnel access sessions at a network device within a communications network.

BACKGROUND OF THE INVENTION

While desktop computers generally remain a part of the same network for a substantial period of time, laptops or other portable computers are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport or by a hotel in order to access the enterprise network, the internet or some other on-line service. Since these other networks are configured somewhat differently, however, the portable computer must also be reconfigured in order to properly communicate with these other networks. Typically, this configuration is performed by the user/subscriber each time that the portable computer is connected to a different network. As will be apparent, this repeated reconfiguration of the portable computer is not only quite time consuming, but is also prone to errors. Further, the user/subscriber is often required to have specific software running on the portable computer in order to communicate with the enterprise network, though such communications may be in conflict with the network over which the portable computer must transfer data to reach the enterprise network.

A subscriber gateway device has been developed by Nomadix, Incorporated of Santa Monica, Calif. This universal subscriber gateway is described by U.S. patent application Ser. No. 08/816,174, entitled "Nomadic Router", filed in the name of inventor Short et. al., on Mar. 12, 1997 and Ser. No. 09/458,602, entitled "Systems and Methods for Authorizing, Authenticating and Accounting Users Having Transparent Computer Access to a Network Using a Gateway Device", filed in the name of inventor Short et. al., on Dec. 8, 1999. These applications have been assigned to Nomadix Incorporated, the same assignee of the present invention. The contents of both of these applications are herein incorporated by reference as if fully setforth here within. The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically adapts to the protocols and other parameters of the host, in order that it may communicate with the new network in a manner that is transparent both to the user/subscriber and the new network. Once the gateway device has appropriately adapted to the user's host, the host can appropriately communicate via the new network, such as the network at a hotel, at home, at an airport, or any other location, in order to access other networks, such as the enterprise network, or other online services, such as the internet.

The user/subscriber, and more specifically the remote or laptop user, benefits from being able to access a myriad of networks without having to undergo the time-consuming and all-too-often daunting task of reconfiguring their host in accordance with network specific configurations. In this fashion, the gateway device is capable of providing more efficient network access to the user/subscriber. A gateway device is also instrumental in providing the user/subscriber broadband network access that can be tailored to the user/subscriber's needs. In many instances the remote user/subscriber is concerned with being able to acquire network access to their home or enterprise network, which are most typically protected by a firewall. The firewall prevents unauthorized access to the enterprise network through a general Internet connection, such as through an Internet service provider. While some access is possible from outside the firewall, such as inbound electronic mail, access to corporate resources such as network databases and application programs are generally not made accessible to hosts located outside the firewall unless the user/subscriber has an active account with a valid username and password combination.

Moreover, as appreciated by those of ordinary skill in the art, different network protocols may be used within the Internet infrastructure and within enterprise networks that pose potential access problems for the remote user. For example, an Internet Protocol (IP) is typically used at the network protocol level to send data through the Internet. An enterprise network, on the other hand, may use any one of a variety of network protocols including IP, IPX, Appletalk, etc. If the IP protocol and the enterprise network protocol are incompatible, then the remote user may be prevented from accessing resources on the enterprise network. Additionally, when a remote user attempts to access the enterprise network through the Internet, typically through an Internet service provider, the remote user is dynamically assigned an IP address. This IP address identifies the host user/subscriber and allows IP packets to be properly routed from and to the host. However, the remote user may be denied access by the firewall of the enterprise network because the IP address assigned by the Internet service provider is not one of the authorized addresses in the corporate network.

In response to these and other problems associated with granting remote access to an enterprise network over the Internet, several techniques have been developed for creating virtual private networks (VPN), wherein a remote node of a single network is interconnected using a publicly accessible communication medium. For example, there are a number of systems that enable user/subscribers to create virtual networks using the Internet as a medium for transporting data between the enterprise network and a remote user. These systems often times include encryption and other security mechanisms to ensure that only authorized users can access the virtual network, and that the data cannot be intercepted.

The most common technique for constructing a VPN is by implementing tunneling. Tunneling works by encapsulating or wrapping a packet or a message from one network protocol in the protocol of another. The encapsulated packet is transmitted over the network via the protocol of the wrapper. This method of packet transmission avoids protocol restrictions, and enables remote users to have seamless access to their enterprise network without any apparent effects from accessing their enterprise network over another network having a different protocol. Several relatively well known tunneling protocols include Microsoft's PPTP, Cisco's Layer Two Forwarding (L2F) protocol, and IETF's L2TP which is a hybrid of L2F and PPTP. While these and other tunneling techniques have some merit, no one single tunneling protocol provides for automated configuration without the need for special client-side (i.e., remote computer) software.

Therefore, an unsatisfied need exists in the industry for a system method that dynamically creates subscriber tunnels automatically and without the need for a pre-established relationship between an Internet access point and a remote enterprise network.

SUMMARY OF THE INVENTION

The present invention comprises a method and apparatus for implementing dynamic tunnel access sessions at a network device within a communications network. The tunnel access sessions are created between a network device, typically a gateway device and a network service, such as the Internet or a corporate intranet and provide for transparent tunnel access sessions for the user/subscribers who access the communications network via the network device. The present invention does not require special client-side software to be loaded on the remote host of the subscriber, and does not require any manual configuration of the remote host. Instead, the gateway device establishes a tunnel, whereby the gateway device operates as one end point and the enterprise network operates as the other end point. Rather than configuring and reconfiguring the remote host each time a tunnel access session is created, the remote host provides the network device with the appropriate subscriber profile information necessary to establish a tunnel access session to a particular network service. Thereafter, the network device accesses the subscriber profile information each time a tunnel access session is warranted for that subscriber to access the network service. In essence, the network device takes the place of the remote host as an end point of the tunnel, spoofing the network service. The tunnel access session that is established from the network device to the network service is such that the network service views the network device as though it were the remote host. By allowing the network device to operate as the end point of the tunnel, the remote host is not limited to a single tunnel per session, but may have numerous tunnel access sessions established simultaneously during a single log-on session.

An embodiment of the present invention is defined in a method for dynamically creating a tunnel in a communications network to provide subscribers access to a network service. The method comprises storing a subscriber profile in a network database. The subscriber profile will include subscriber-specific network service tunneling requirements that have either been predefined by the subscriber or the network device administrator. A request from a subscriber host for network service access is then received at the network device and the network device accesses the network database to determine within the subscriber's profile the tunneling requirements for network service that is being requested. If a determination is made that a tunnel is required then the network device establishes a tunnel access session between the network device and the network service. The establishment of the tunnel access session at the network device is transparent to the subscriber.

An additional embodiment of the present invention is defined in a network device that dynamically creates a tunnel access session in a communications network to provide a subscriber host access to a destination network. The device comprises a processor that receives a request from a subscriber for access to a network service, a database accessed by the processor that stores a subscriber profile that defines the tunnel requirements for the network service and a tunnel management module implemented by the processor that communicates with the database to determine if the subscriber requires a tunnel for access to the network service. If a determination is made that the tunnel is required, the tunnel management module creates a tunnel access session between the network device and the network service. Additionally the network device may comprise a session management module implemented by the processor that communicates with the database to manage the tunnel access sessions provided by the network device.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
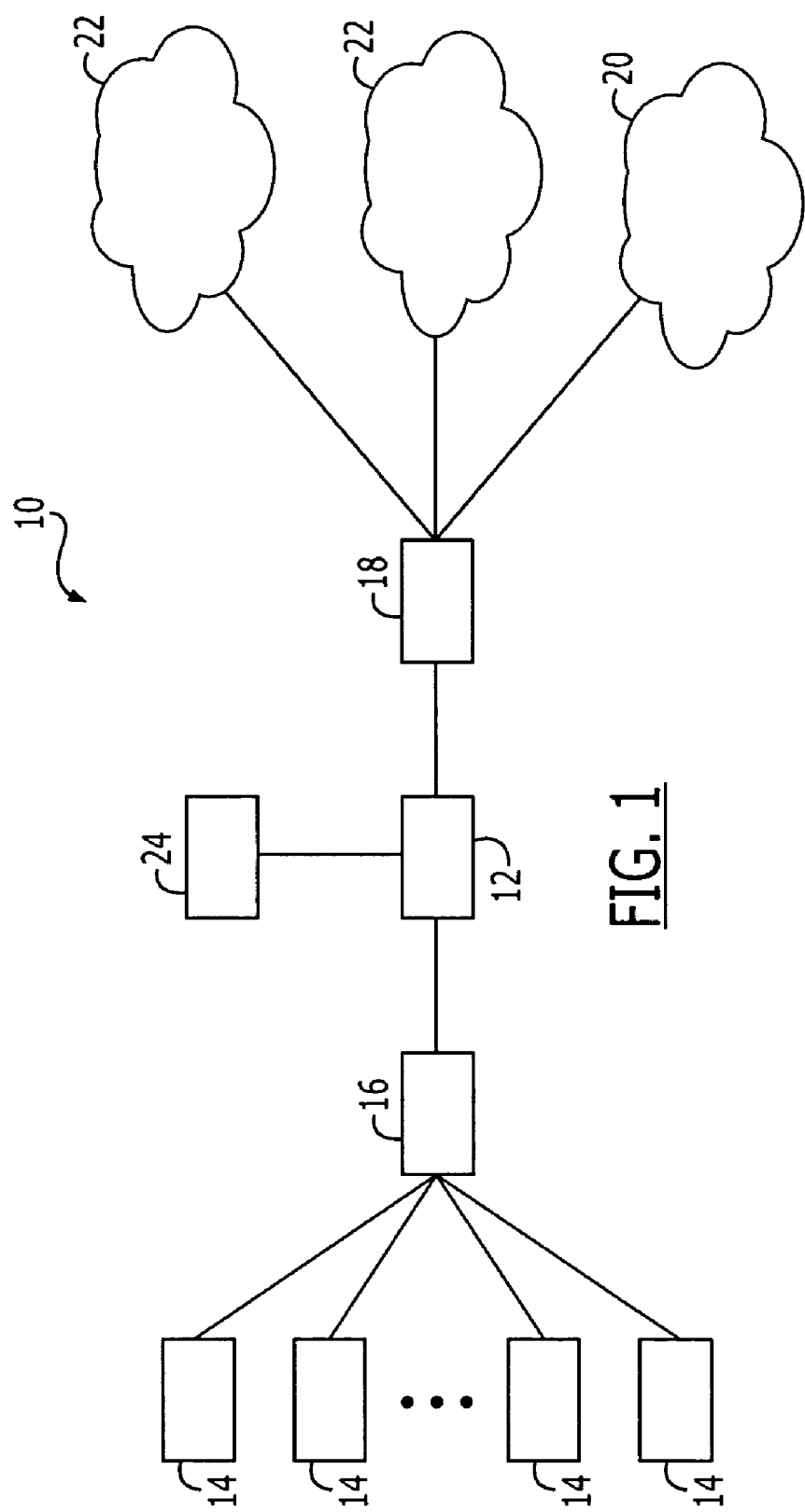
FIG. 1 is block diagram of a communication network that provides for the dynamic establishment of tunnels for communication between a remote host and a network service, in accordance with an embodiment of the present invention.

Referring now to FIG. 1, the communications network 10 that includes a gateway device 12 is depicted in block diagram form. The network system typically includes a plurality of user/subscriber hosts 14 that access the network in order to gain access to other networks or other online services. For example, the hosts can be in communication with ports that are located in different rooms of a hotel, a multi-dwelling residence or an office building. Alternatively, the hosts can in communication with ports in an airport, an arena, or the like. The communication network also includes a gateway device that provides an interface between the plurality of hosts and the various networks or other online services. Most commonly, the gateway device is located near the hosts at a relatively low position in the structure of the overall network. (i.e. the gateway will be located within the hotel, multi-unit residence, airport, etc.) However, the gateway device can be located at a higher position in the overall network structure such as at a Point of Presence (PoP) of Network Operating Center (NOC), if so desired. Although the gateway device can be physically embodied in many different fashions, the gateway device typically includes a controller and a memory device in which software is stored that defines the operational characteristics of the gateway device. Alternatively, the gateway device can be embedded within another network device, such as the access controller or a router, or the software that defines the functioning of the gateway device can be stored on a PCMCIA card that can be inserted into the host in order to automatically reconfigure the host to communicate with a different communications network.

The network system 10 also typically includes an access controller 16 positioned between the hosts 14 and the gateway device 12 for multiplexing the signals received from the plurality of hosts onto a link to the gateway device. Depending upon the medium by which the hosts are connected to the access controller, the access controller can be configured in different manners. For example, the access controller can be a digital subscriber line access module (DSLAM) for signals transmitted via regular telephone lines, a cable modem termination system (CMTS) for signals transmitted via coaxial/optical fiber cables, a wireless access point (WAP) for signals transmitted via a wireless network, a switch or the like. As also shown in FIG. 1, the network system typically includes one or more routers 18 and/or servers (not shown in FIG. 1) in communication with a plurality of networks 20 or other online services 22. While the communication network is depicted to have a single router, the communication network can have a plurality of routers, switches, bridges, or the like that are arranged in some hierarchical fashion in order to appropriately route traffic to and from the various networks or other online services. In this regard, the gateway device typically establishes a link with one or more routers. The routers, in turn, establish links with the servers of other networks or other online service providers, such as internet service providers, based upon the subscriber's selection.

The gateway device 12 is specifically designed to configure hosts 14 that log onto the network 10 in a manner that is transparent to the subscriber. In the typical network that employs dynamic host configuration protocol (DHCP) service, the DHCP server 24 will initially assign an IP address to a host that is logging onto the network through communication with the gateway device. While illustrated as a separate device from the gateway device 12, the DHCP server 24 may be incorporated into the physical embodiment housing the gateway device. Upon opening their web browser or otherwise attempting to access an on-line service, the gateway device will typically direct the subscriber to enter the ID and password corresponding to the desired on-line service that the subscriber is attempting to access. The gateway device then determines if the subscriber is entitled to access the service, the level of access and/or the type of services to which the subscriber is entitled according to an Authentication, Authorization and Accounting (AAA) procedure that is described by U.S. patent application Ser. No. 08/816,174 and U.S. patent application Ser. No. 09/458, 602, previously incorporated herein by reference.

An AAA server, which is a database of subscriber records, may be remote to the gateway device or the AAA database may be incorporated into the physical embodiment housing the gateway device. Assuming that the subscriber has been authenticated and has authorization, the gateway device typically presents new subscribers with a home page or control panel that identifies, among other things, the online services or other networks that are accessible via the gateway device. In addition, the home page presented by the gateway device can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the network system will come at a cost, such that the gateway administrator will charge the subscriber a higher rate for their service (e.g. increased bandwidth).

The home page also permits the subscriber to select the network 20 or other online service 22 that the subscriber wishes to access. For example, the subscriber can access the enterprise network on which the host is customarily resident. Alternatively, the subscriber can access the internet or other on-line services. Once the subscriber elects to access a network or other online service, the gateway device establishes an appropriate link or tunnel to the desired network or online service, as discussed in detail below.

Thereafter, the subscriber can communicate freely with the desired network 20 or other online service 22. In order to support this communication, the gateway device 12 generally performs a packet translation function that is transparent to the user/subscriber. In this regard, for outbound traffic from the host 12 to the network or other on-line service, the gateway device changes attributes within the packet coming from the user/subscriber, such as the source address, checksum, and application specific parameters, to meet the criteria of the network to which the user/subscriber has accessed. In addition, the outgoing packet includes an attribute that will direct all incoming packets from the accessed network to be routed through the gateway device. In contrast the inbound traffic from the network or other online service that is routed through the gateway device undergoes a translation function at the gateway device so that the packets are properly formatted for the user/subscriber's host. In this manner, the packet translation process that takes place at the gateway device is transparent to the host, which appears to send and receive data directly from the accessed network. Additional information regarding the translation function is provided by previously referenced U.S. patent application Ser. No. 08/816,174. By implementing the gateway device as an interface between the user/subscriber and the network or other online service the user/subscriber will eliminate the need to re-configure their host 12 upon accessing subsequent networks.

Figure 2:
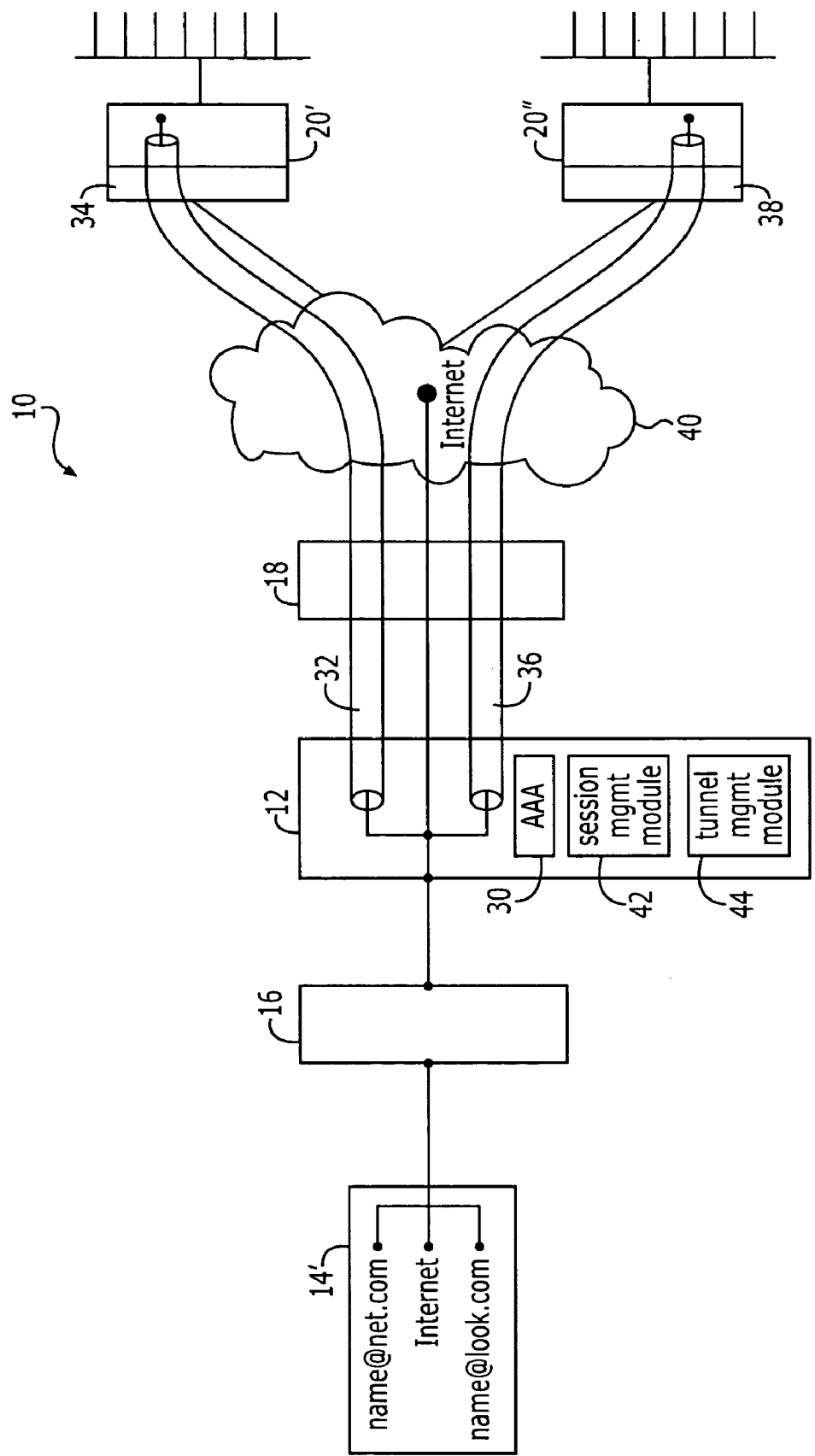
FIG. 2 is a block diagram of a communications network that provides for the dynamic establishment of two simultaneous tunnel sessions, in accordance with an embodiment of the present invention.

In accordance with an embodiment of the present invention, the dynamic establishment and management of subscriber-transparent tunnels in a communication system 10 is depicted in the schematic diagram of FIG. 2. As illustrated in FIG. 2, a network device 12, such as a gateway device provides automatic configuration of tunnels without the need for specialized client-side software on host 14'. Thus, the establishment of the tunnels at the network device is transparent to the subscriber. Multiple subscribers who communicate with the network device and are qualified for access to the network or online service that the tunnel communicates with may implement the tunnel simultaneously. Further, the network device 12 enables a single user/subscriber to establish two or more tunnels simultaneously since the tunnels do not depend upon a particular configuration on the user/subscriber host 14'.

A user/subscriber initially sets up an account with network device 12 via a web browser interface, wherein the user/subscriber enters various user unique data, including that which is necessary for establishing connections to the networks and/or online services that the user/subscriber wishes to gain access. Typically, for each network that the user/subscriber desires access to a request will be forwarded to the user/subscriber querying them to enter authorization information (such as a user name, network access identifier, and password). The information entered by the user/subscriber will be used to create a profile that will be stored in the authorization file in the AAA module 30 of the network device 12. These user-specific profiles will then in turn be used by the network device in determining whether a tunnel will be created when a user/subscriber requests access. The user/subscriber will be provided with the capability to add, delete and/or modify his or her profile, including the information for establishing tunnels. Additionally, the network device administrator may provision for a tunneled connection for a user/subscriber by modifying the user/subscriber profile in the AAA module. A group of user/subscribers is typically provided tunneled connections by modifying a group profile in a database table that may be internal or external to the network device. The network device administrator may use Lightweight Directory Access Protocol (LDAP) or a similar communication link to implement the modifications to group profiles.

While the AAA module 30 is illustrated as an integral component of the network device 12, it is noted that the AAA module 30 may be disposed in a remote location, central to and accessible by a plurality of network devices that implement the establishment of subscriber-transparent tunneling. For instance, a plurality of network devices may be utilized by a regional or national chain of hotels providing seamless network access to the occupants of the various rooms in the hotels.

At the beginning of a new network access session by the user/subscriber, the user/subscriber logs onto the network device 12 by entering his or her account user name and password. The user/subscriber can then select access to one or more of the networks and/or online services available through network device 12. For example, as illustrated in FIG. 2, the user/subscriber of host 14' has simultaneously established access to three separate networks, two of which are being accessed through unique tunnels. A first tunnel 32 provides access to network 20'. The tunnel 32 was established when the user/subscriber requested access to network service 20', typically from a web browser interface, which caused a setup notification packet to be sent from the user/subscriber host 14' to the network device 12. The network device 12 identifies the packet as originating from the user/subscriber by cross-referencing a specific subscriber identifier, typically the MAC address of the packet, the IP address or the originating port identifier with the corresponding authorization table in the AAA module 30. By referencing the subscriber identifier in the packet with the profile of the user/subscriber (where the user/subscriber provided a list of networks for access via a tunnel), the network device 12 can determine if a tunnel is needed to provide the user/subscriber with access to the network service 20'. If a tunnel is not needed, then the user/subscriber is provided with standard network access. However, if a tunnel is needed, the tunnel management module 44 of the gateway device 12 determines if a tunnel to the network service 20' has already been established, and if so, places the packet in the existing tunnel. If a tunnel does not exist, then the tunnel management module 44 establishes a tunnel utilizing the profile information provided by the user/subscriber during account creation and/or subsequent modification. If the user/subscriber did not provide all the necessary information to establish the tunnel connection because, for example, concern over security of the information, the user/subscriber is presented with a request for additional information via a web page or via an information and control console panel on the host that requests the missing information.

The tunnel management module 44 contacts the network service 20' in order to establish tunnel access to the network service 20', typically through a firewall 34 or other secure access server. Using the authorization information provided when the user/subscriber initially set up his or her account (e.g., such as a user name, network access identifier, and password), the network device 12 is given access to network service 20', assuming the network service 20' authenticates and accepts the connection. The resulting tunnel established by the tunnel management module 44 is between the network device 12 and the network service 20' and may be implemented by any suitable tunneling protocol supported by the network service 20', such as L2TP, PPTP or PPPoE. From the server-side perspective of the network service 20', the fact that the tunnel terminates at the network device 12 rather than at the user/subscriber host 14' is undetectable. The network device 12 essentially spoofs the network service 20' to believing that the tunnel extends all the way to an end point at the user/subscriber host 14'. However, since the end point is at the network device 12 rather than the user/subscriber host 14', multiple tunnels can be established simultaneously during a single session because the tunnels are not dependent upon the configuration of specific software at the user/subscriber host 14'. In addition, the tunnel management module 44 of the network device 12 is able to dynamically create a tunnel on behalf of a user/subscriber utilizing the network log-on information provided by the user/subscriber. The session management module 42 manages the access sessions of each subscriber who accesses the communication network through the network device, recording information about the sessions as desired. The session management module provides for tables of routes and services available to one or more subscribers in the communications network. The tables provide the impetus to match a given subscriber's authorized services/networks with those that require tunneled communication.

As illustrated in FIG. 2, a second tunnel 36 is established on behalf of the user/subscriber for providing access to the network service 20" through firewall 38. The tunnel 36 can be established in substantially the same manner as described above with regard to tunnel 32. In addition, the user/subscriber may be given access to other networks and/or online services that do not require a tunnel connection, such as the worldwide web portion of the Internet 40.

As previously mentioned, the user/subscriber host 14' does not require any specific client-side software for accessing the network services 20', 20", but only requires a standard communication protocol for communicating with the network device 12, such as TCP/IP. Once established, the tunnels 32, 36 can receive data packets from the individual networks in virtually any protocol. This is made possible by the network device decapsulating the data packets as they exit a tunnel in preparation for transmission to the subscriber host. The tunnels can be terminated by an express command of the network service 20', 20" or the user/subscriber host 14'. Alternatively, the tunnels may timeout if they are not utilized within a certain predetermined period of time.

Figure 3:
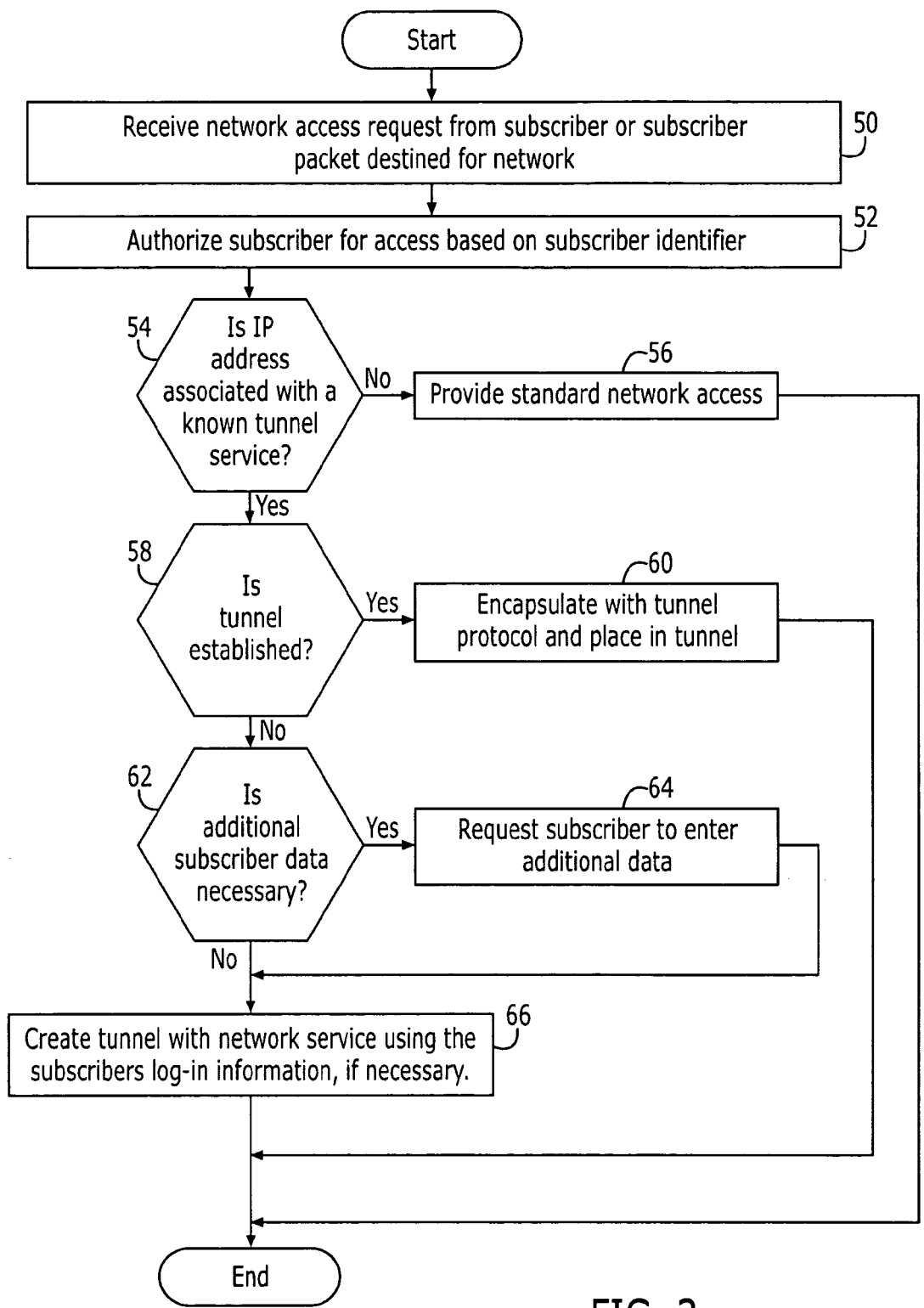
FIG. 3 is a flowchart diagram of a method for creating and managing tunnels in a communications network, in accordance with an embodiment of the present invention.

With reference to FIG. 3, a flowchart diagram of a methodology of tunnel management in accordance with the environment of the present invention is illustrated. At block 50, the network device receives a packet destined for a tunneled service or an explicit network access request from a user/subscriber. The network access request may come from a user/subscriber's manual input of access request data (i.e. username, password, etc.) or the information may be stored in memory within the user/subscriber's host with the access request being generated automatically. Once the packet or request is received at the network device the user/subscriber is then authorized for network access by utilizing a subscriber identifier in the header of the network access request packets to look up the user/subscriber's profile in the AAA module, as indicated by block 52. At block 54, within the tunnel management module of the network device, a determination is made to ascertain if the destination IP address of the packet being sent from the user/subscriber is associated with an network service which requires a tunnel for access. If the destination IP address does not require a tunnel for access, then the user/subscriber is provided with standard network access, as indicated by block 56.

If the tunnel management module determines that the destination IP address is associated with a network service that requires tunneling for that particular subscriber, then it is determined at block 58 if a tunnel has already been established. If a tunnel has been established, then, at block 60, the packet is encapsulated using the tunnel protocol appropriate for that network service, and any other translation or routing instructions that may pertain to data packet is undertaken. Once the encapsulation/translation of the packet is completed it is placed in the tunnel for delivery to the network service.

If the tunnel management module determines at block 58 that a tunnel has not yet been established for the requested network, then it is determined at block 62 if additional subscriber data not provided for in the AAA module subscriber profile is necessary to log into the network service for establishing a tunnel between the network service and the network device. If additional subscriber data is necessary, then, at block 64, a subscriber data request packet is sent from the network device to the user/subscriber. The data request may take the form of an information and control panel displayed on the host of user/subscriber or the user/subscriber may be directed to a web page or a similar data request method may be used.

If no additional subscriber data is needed or once subscriber data is obtained, then a tunnel is created with the destination network using the subscriber's network log-in information, if necessary. The tunnel is created with the network device as one end point and the destination network as the other end point as indicated by block 66. Once the tunnel is created packets being received from the user/subscriber and destined for the destination network will be encapsulated with tunnel protocol and placed in the tunnel. The existence of the tunnel insures that packets coming from the network service are routed through the gateway device prior to delivery to the user/subscriber. The network device will decapsulate packets coming through the tunnel from the network service prior to transmitting the packets to the user/subscriber.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for dynamically creating a tunnel in a communications network to provide subscribers host access to a network service, comprising:
storing a subscriber profile in a network database, wherein the subscriber profile includes subscriber-specific network service tunneling requirements for a plurality of network services that are available to the subscriber, the network service tunneling requirements including information for identifying tunnel requirements for each of those services;
receiving at a network device a first subscriber data packet associated with a first network service;
accessing the subscriber profile to determine if the first network service has a subscriber-specific tunneling requirement; and
creating a first tunnel if a determination is made that the subscriber profile requires a first network service tunnel, wherein the first tunnel has a first end point at the network device and a second end point at the first network service; and
providing simultaneous access to a tunnel access session to more than one subscriber accessing the communications network,
wherein the subscriber profile defines tunneling requirements for the plurality of network services that the subscriber has been authorized to access.

2. The method of claim 1, wherein storing a subscriber profile comprises storing at least one parameter chosen from the group consisting of the network access identifier, a user/subscriber name and a user/subscriber password.

3. The method of claim 1, further comprising determining if a first tunnel between the network device and the first network service pre-exists prior to creating the tunnel between the network device and the first network service.

4. The method of claim 1, wherein more than one subscriber accessing the communication network through the network device can simultaneously transmit data packets to the first network service via the first tunnel.

5. The method of claim 1, further comprising:
receiving at the network device a second subscriber data packet associated with a second network service;
accessing the subscriber profile to determine if the second network service has a subscriber-specific tunneling requirement; and
creating a second tunnel if a determination is made that the subscriber profile requires a second network service tunnel, wherein the second tunnel has a first end point at the network device and a second end point at the second network service.

6. The method of claim 5, further comprising determining if a second tunnel between the network device and the second network service pre-exists prior to creating the tunnel between the network device and the second network service.

7. The method of claim 5, wherein the second tunnel is functional simultaneous with the functioning of the first tunnel.

8. The method of claim 5, wherein the more than one subscriber accessing the communication network through the network device can simultaneously transmit data packets to the first network service via the first tunnel and the second network service via the second tunnel.

9. A system for dynamically creating a tunnel in a communications network to provide a subscriber host access to a destination network, comprising:
- a storage device that stores a subscriber profile, wherein the subscriber profile includes subscriber-specific network service tunneling requirements for a plurality of network services that are available to the subscriber, the network service tunneling requirements including information for identifying tunnel requirements for each of those services;
- means for receiving at a network device a first data packet associated with a first network service;
- means for accessing the subscriber profile to determine if the first network service has a subscriber-specific tunneling requirement; and
- means for creating a first tunnel if a determination is made that the subscriber profile requires a first network service tunnel, wherein the first tunnel has a first end point at the first end point at the network device and a second end point at the first network service,
- wherein the means for creating a first tunnel is capable of providing simultaneous access to a tunnel access session to more than one subscriber accessing the communications network, and
- wherein the subscriber profile defines tunneling requirements for more than one network services that the subscriber has been authorized to access.

10. The system of claim 9, further comprising a means for determining if a first tunnel between the network device and the first network service pre-exists prior to creating the tunnel between the network device and the first network service.

11. The system of claim 9, further comprising:
- means for receiving at the network device a second data packet associated with a second network service;
- means for accessing the subscriber profile to determine if the second network service has a subscriber-specific tunneling requirement; and
- means for creating a second tunnel if a determination is made that the subscriber profile requires a second network service tunnel, wherein the second tunnel has a first end point at the network device and a second end point at the second network service.

12. A network device that dynamically creates a tunnel in a communications network to provide a subscriber host access to a destination network, comprising:
- a processor that receives from a subscriber a data packet associated with a network service;
- a database accessed by the processor that stores a subscriber profile that defines subscriber-specific network service tunnel requirements for a plurality of network services, the subscriber-specific network service tunnel requirements including information for identifying requirements for establishing a tunnel for each of those services; and
- a tunnel management module implemented by the processor that communicates with the database to determine if the subscriber requires a tunnel for access to the network service and, if a determination is made that the tunnel is required, the tunnel management module creates a tunnel access session between the network device and the network service,
- wherein the tunnel management module is capable of providing simultaneous access to the tunnel access session to more than one subscriber accessing the communications network through the network device, and
- wherein the subscriber profile defines tunneling requirements for the more than one network services that the subscriber has been authorized to access.

13. The network device of claim 12, further comprising a session management module implemented by the processor that communicates with the database to manage the tunnel access session provided by the network device.

14. The network device of claim 12, wherein the tunnel management module determines if a tunnel between the network device and the network service pre-exists prior to creating the tunnel between the network device and the network service.

15. The network device of claim 12, further comprising a session management module implemented by the processor that communicates with the database to manage the simultaneous tunnel access session provided to more than one subscriber accessing the communication network through the network device.

16. The network device of claim 12, wherein the tunneling requirements are predefined by the subscriber.

17. The network device of claim 12, wherein the tunneling requirements are predefined by the network device administrator.

18. The network device of claim 12, wherein the tunnel management module is capable of creating more than one tunnel access session for simultaneous subscriber access to more than one network service.

* * * * *